United States Patent [19]

Sudmanns et al.

[11] Patent Number: 5,440,881
[45] Date of Patent: Aug. 15, 1995

[54] INTAKE SYSTEM FOR AN INTERNAL-COMBUSTION ENGINE FOR USE IN ONE-STAGE OR TWO-STAGE SUPERCHARGING

[75] Inventors: Hans Sudmanns; Karl Schier, both of Friedrichshafen, Germany

[73] Assignee: MTU Motor- und Turbinen-Union Friedrichshafen, Germany

[21] Appl. No.: 828,989
[22] PCT Filed: May 24, 1991
[86] PCT No.: PCT/DE91/00431
  § 371 Date: Jan. 31, 1992
  § 102(e) Date: Jan. 31, 1992
[87] PCT Pub. No.: WO91/19086
  PCT Pub. Date: Dec. 12, 1991

[30] Foreign Application Priority Data

Jun. 2, 1990 [DE] Germany .......... 40 17 823.4

[51] Int. Cl.⁶ .......... F02B 37/02
[52] U.S. Cl. .......... 60/612; 60/605.1
[58] Field of Search .......... 60/612, 599, 605.1; 123/563

[56] References Cited

U.S. PATENT DOCUMENTS

| | | | |
|---|---|---|---|
| 2,739,440 | 3/1956 | Seifert | 60/612 X |
| 3,027,706 | 4/1962 | Sprick | 60/612 X |
| 4,458,491 | 7/1984 | Deutschmann | 60/612 |

FOREIGN PATENT DOCUMENTS

| | | |
|---|---|---|
| 2059220 | 6/1972 | Germany . |
| 3005655 | 8/1981 | Germany . |
| 3633405 | 4/1988 | Germany . |
| 24417 | 2/1982 | Japan . |
| 101223 | 6/1985 | Japan . |
| 2069593 | 8/1981 | United Kingdom . |

*Primary Examiner*—Micahel Koczo
*Attorney, Agent, or Firm*—Barnes & Thornburg

[57] ABSTRACT

The invention relates to an intake system for an internal-combustion engine charged in one or two stages. The intake system is to be used with as few changes as possible in both a one-stage as well as a two-stage supercharging. The exhaust gas turbochargers, the charge air coolers and the air collecting housings as well as the interconnect pipes between these system parts and the pipes to the inlet ducts of the cylinder heads are used in the same arrangement in both a one-stage and a two-stage supercharging. The arrangement of the charge air cooler used in the one-stage supercharging, is the same as the high-pressure charge air cooler of the two-stage supercharging. The arrangement of the exhaust gas turbochargers in the one-stage supercharging, is the same as that of the high-pressure exhaust gas turbochargers in the two-stage supercharging. Additional advantageous are achieved by the arrangement of the charge air coolers on the air collecting housing and exhaust gas turbochargers on a narrow side of the air collecting housing.

24 Claims, 5 Drawing Sheets

INTAKE SYSTEM FOR AN INTERNAL-COMBUSTION ENGINE FOR USE IN ONE-STAGE OR TWO-STAGE SUPERCHARGING

BACKGROUND AND SUMMARY OF THE INVENTION

The invention relates to an intake system for internal-combustion engines supercharged in one or two stages in which taken-in combustion air, is led from the compressors of the exhaust gas turbochargers through interposed charge air coolers to an air collecting housing of the internal-combustion engine and finally from there to the inlet ducts of the cylinder heads of the internal-combustion engine.

An intake system of this general type is known from the German Patent Document DE-OS 20 59 220. In the case of this internal-combustion engine with a V-shaped arrangement of the cylinders in two banks, an exhaust gas turbocharger is assigned to each cylinder bank for the one-stage charging. The combustion air, which is compressed by the compressors, arrives in collecting pipes extending along the internal-combustion engine in which the charge air coolers are integrated. By means of a series connection of several block-shaped heat exchanger elements, a low overall height of the collecting pipes is achieved. It is not indicated, however, how a space-saving arrangement of an intake system is to be designed with exhaust gas turbochargers, charge air coolers and collecting housings at constructional expenditures that are as low as possible when the internal-combustion engine is to be changed into an internal-combustion engine which is supercharged in two stages.

The instant invention is based on the object of providing an intake system which, while only a few different components are used, can be used for a one-stage as well as for a two-stage supercharging, and as a result offers logistical advantages, which, in addition, makes it possible to render the dimensions of the engine variants and the mounting of the intake systems largely uniform, and which is also favorable with respect to air flow guiding.

This object is achieved in the case of a construction of the intake system for use in one-stage or two-stage supercharging, of having at least one exhaust gas turbocharger, one charge air cooler and one air collecting housing, with connecting pipes therebetween and to the inlet ducts of the cylinder heads. Accordingly, the exhaust gas turbochargers, the charge air coolers and the air collecting housings as well as the pipes to the inlet ducts of the cylinder heads are used in the same arrangement in one-stage supercharging as in two-stage supercharging. Naturally, in the case of a two-stage supercharging, a low-pressure charge air cooler must be added. Instead of the charge air cooler used in the case of the one-stage supercharging, a high-pressure charge air cooler is provided. And instead of the exhaust gas turbochargers used in a one-stage supercharging, high-pressure exhaust gas turbochargers are provided. In one-stage supercharging, the flow housing forms an intake housing with an intake funnel, and in the two-stage supercharging, the flow housing encloses the cooling element of the low-pressure charge air cooler. Both flow housings are constructed with an identical bottom part which is arranged at the same point on the engine in one-stage and in two-stage supercharging. This standardization leads to logistical advantages with a corresponding cost reduction. The assembly is simplified and the space requirement is similar in the case of the one-stage and two-stage supercharging. The intake system is also favorable with respect to air flow guiding. A particularly low space requirement and an optimal flow guidance with a good distribution of the flow to the cylinders is obtained if the air collecting housing extends between cylinder banks arranged in a V-shape along the internal-combustion engine and if system parts can be arranged on the top side of the air collecting housing. In one-stage supercharging, an intake funnel and a charge air cooler are arranged next to one another on the air collecting housing. In two-stage supercharging, a high-pressure charge air cooler and a low-pressure charge air cooler are arranged next to one another on the air collecting housing. Having the exhaust gas turbochargers on a narrow side of the air collecting housing and a bottom part of the housing having connection tubes situated directly opposite the inlets of the compressors, further reduces the space requirement and is particularly advantageous with respect to air flow guidance. The intake system has an upper wall boundary of the air collecting housing in a tub-shaped construction so that a flow space is formed by which air reaches the molded-on connection tube connected with the intake connections of the compressors. In multi-stage supercharging, one exhaust gas turbocharger is normally assigned to each cylinder bank. In the case of a two-stage supercharging, an exhaust gas turbocharger group is assigned to each cylinder bank. In the case of a partial engine load, when a low amount of exhaust gas is available, the exhaust gas ejected by the two cylinder banks is used to drive only one charger or one group of exhaust gas turbochargers. The exhaust gas pipe leading to the turbine and the intake pipe of a corresponding exhaust gas turbocharger leading to the compressor are therefore equipped with shut-off devices which are actuated for the shutting-off of the exhaust gas turbocharger. In one-stage supercharging, the compressor-side shut-off device is advantageously arranged at the inlet of the intake funnel because such a location is easily accessible for servicing operations. In this arrangement, the flow ducts must be separated inside the intake funnel. A transverse wall is therefore provided in the intake funnel which, together with webs in the tub-shaped bottom part of the housing, form separate intake ducts for the two intake connections of the compressors. In a two-stage supercharging with two exhaust gas turbocharger groups assigned to the two cylinder banks and with a switching-off of one exhaust gas turbocharger group at partial load, it is also necessary to separate the intake ducts in the intercooler. For this reason, two separate heat exchanger elements are used which are separated by a transverse wall in the housing. This transverse wall, together with the webs in the tub-shaped flow space disposed underneath, forms separate flow ducts for the exhaust gas turbochargers respectively assigned to each cylinder bank. The tub-shaped flow space (molded to the air collecting housing with webs for separate flow ducts) may therefore be maintained unchanged in one-stage, two-stage or multi-stage supercharging. In addition, to provide for a space-saving construction, the housing of the charge air cooler is constructed as a lid for the air collecting housing. The charge air is introduced into the housings of the charge air coolers by way of lateral inlets situated on the top.

Other objects, advantages and novel features of the present invention will become apparent from the following detailed description of the invention when considered in conjunction with the accompanying drawings.

DETAILED DESCRIPTION OF THE DRAWINGS

Figure 1:
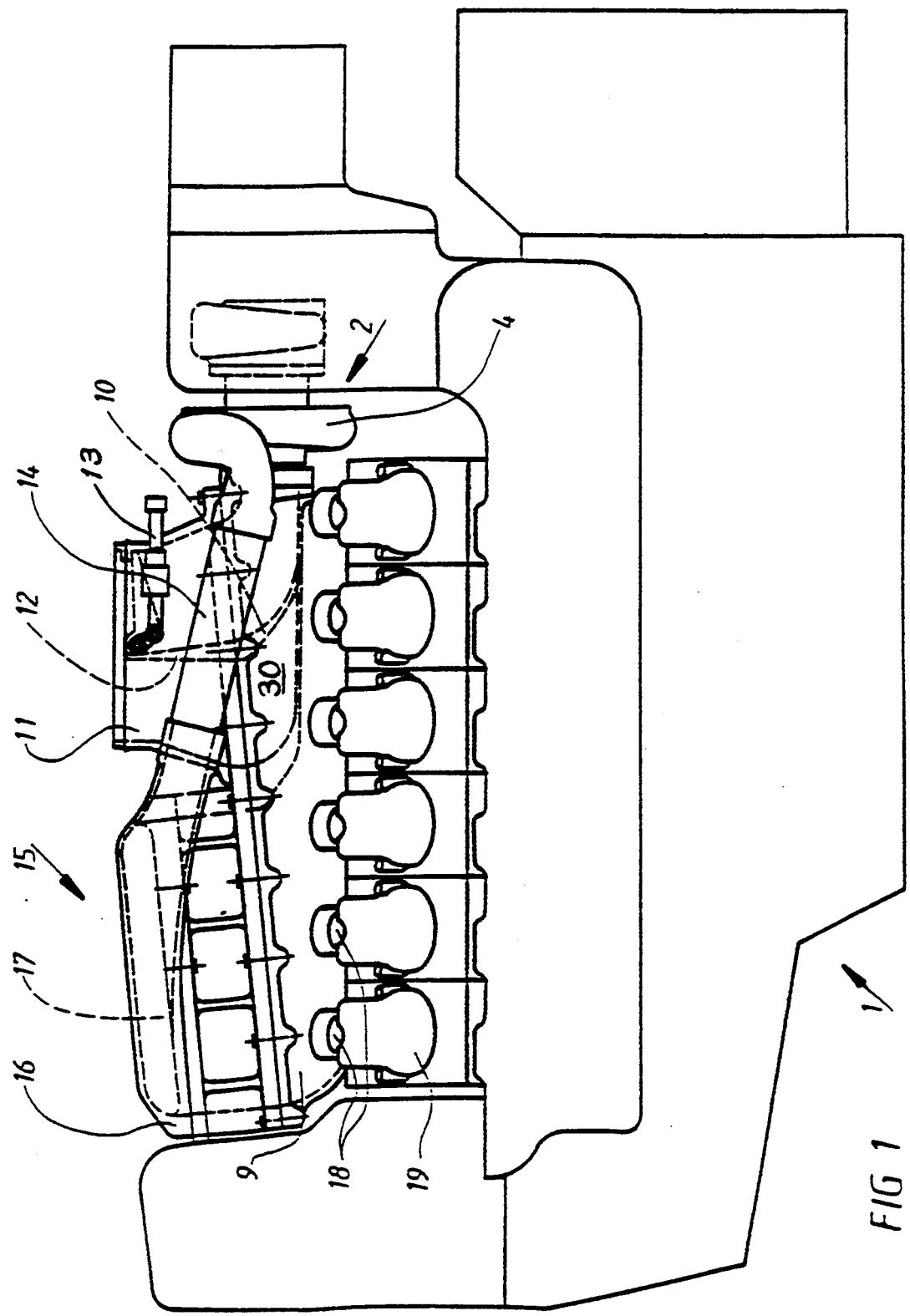
FIG. 1 is a longitudinal view of an internal-combustion engine and of the intake system for a one-stage supercharging.
Figure 2:
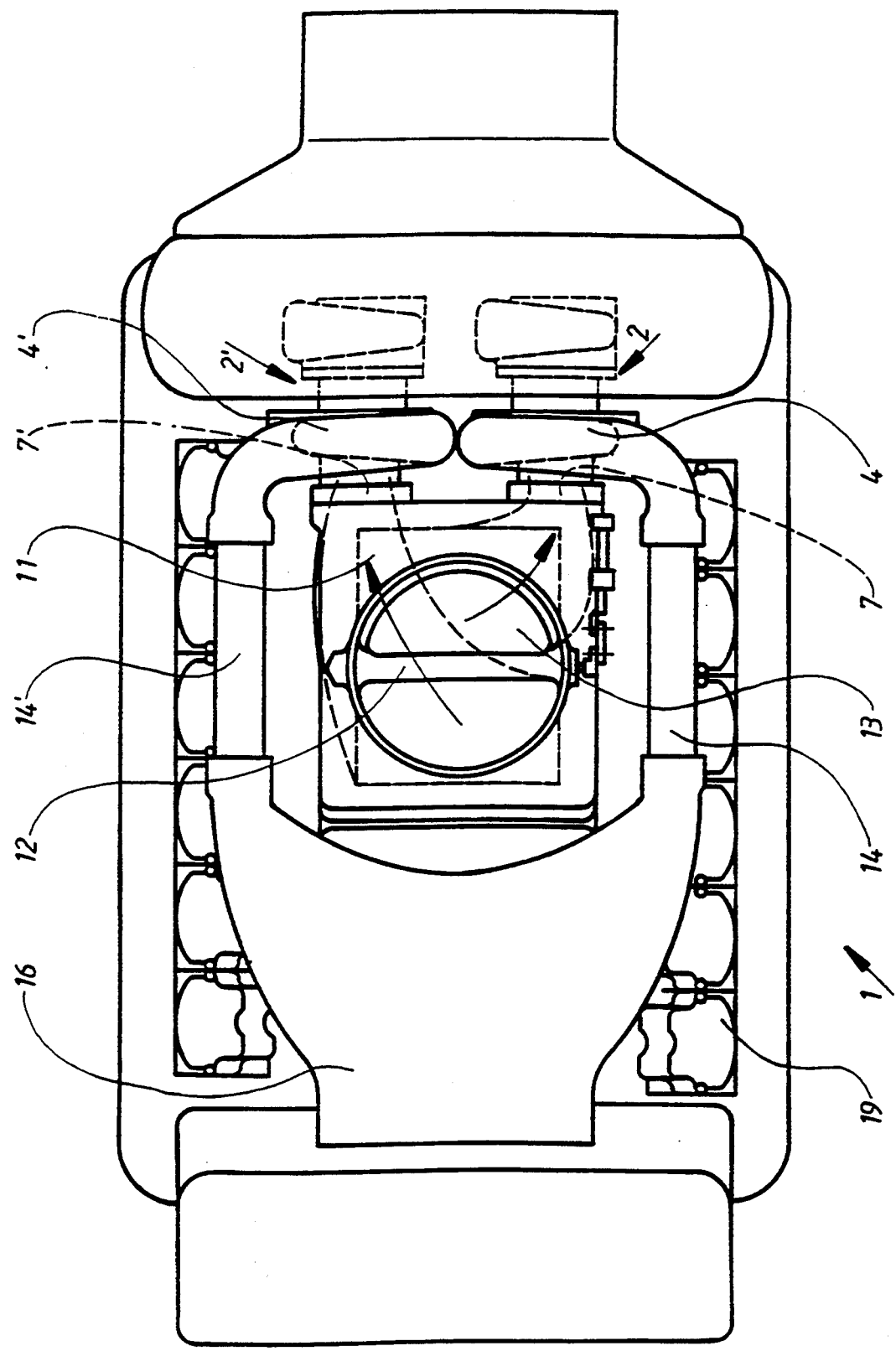
FIG. 2 is a top view of an internal-combustion engine and the intake system for a one-stage supercharging.

The internal-combustion engine 1 (with the intake system illustrated in FIG. 1 and 2 in a longitudinal view and in a top view, respectively) is supercharged in one stage. In this case, one exhaust gas turbocharger 2, 2' respectively is assigned to each of the two cylinder banks arranged in a V-shape. One of these exhaust gas turbochargers is constructed with shut-off devices for a shutting-off at partial load. The two compressors 4, 4' of the two exhaust gas turbochargers 2, 2' receive combustion air by way of connection tubes 7, 7' which are molded to an air collecting housing 9. The connection tubes 7, 7' are connected with separate flow ducts of the flow housing 30, which flow ducts are formed with a tub-shaped bottom part, which is also molded to the air collecting housing 9. Atop of the flow ducts is an intake funnel 11. The flow ducts and intake funnel comprise the flow housing 30. Naturally, the bottom part may also be constructed as a separate component (not shown) not molded onto the air collecting housing 9 and which is placed on the air collecting housing 9. A transverse wall 12 extends in the intake funnel and, together with webs 10 in the tub-shaped bottom part, forms separate intake paths for the compressors 4, 4' of the exhaust gas turbochargers 2, 2'. One of the two flow paths can be shut off by the shut-off device 13 in the inlet of the intake funnel 11. The shut off device is constructed as a flap. In this arrangement, the flap is easily accessible for servicing work, for example. The arrangement of the compressors 4, 4' directly on the narrow side of the air collecting housing 9 with intake connections aligned in the direction of the air collecting housing 9 ensures an optimal air guidance with short flow paths. The compressed air leaving the compressors 4, 4' reaches the charge air cooler 15 by way of pipes 14, 14'. The housing 16 of the air cooler 15 forms a lid for the air collecting housing 9 disposed underneath. The housing 16 of the charge air cooler 15 is disposed directly next to the intake housing intake funnel 11. The charge air flows into the housing 16 of the charge air coller 15 by way of lateral openings 17, and into the air collecting housing 9 which both cylinder banks have in common by way of the heat exchanger elements of the charge air cooler 15. The air collecting housing 9 is connected with the inlet ducts of the cylinder heads 19, by way of separate connection tubes 18. The latter has the advantage that the cylinder heads 19 can be removed, without the requirement of demounting the whole intake system. In addition, the connection tubes 18 can easily be changed for different inflow and connecting conditions (such as a two-valve or four-valve head) of the cylinder heads 19 without the requirements of changing the air collecting housing.

Figure 3:
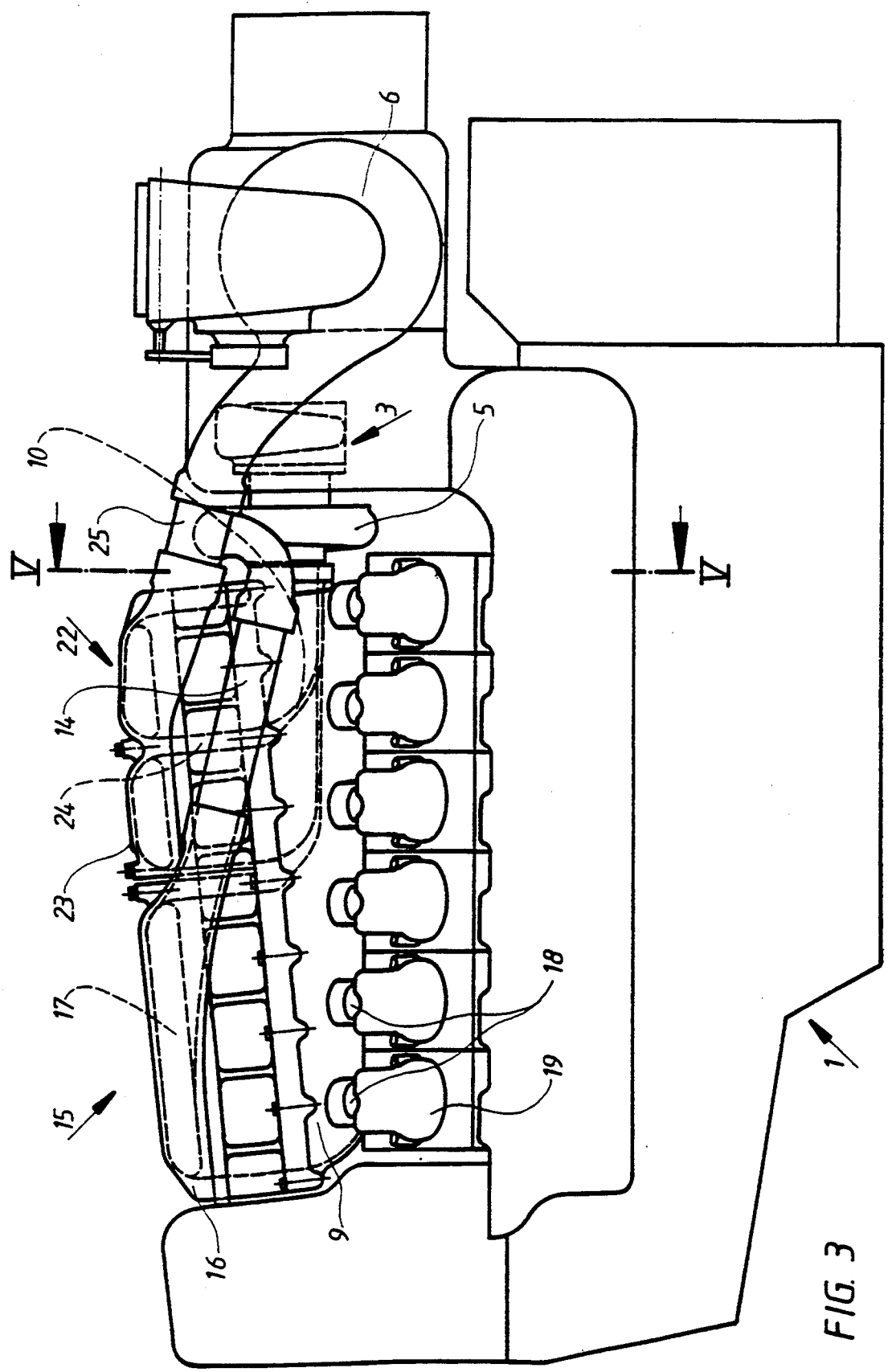
FIG. 3 is a longitudinal view of an internal-combustion engine and of the intake system for a two-stage supercharging.
Figure 4:
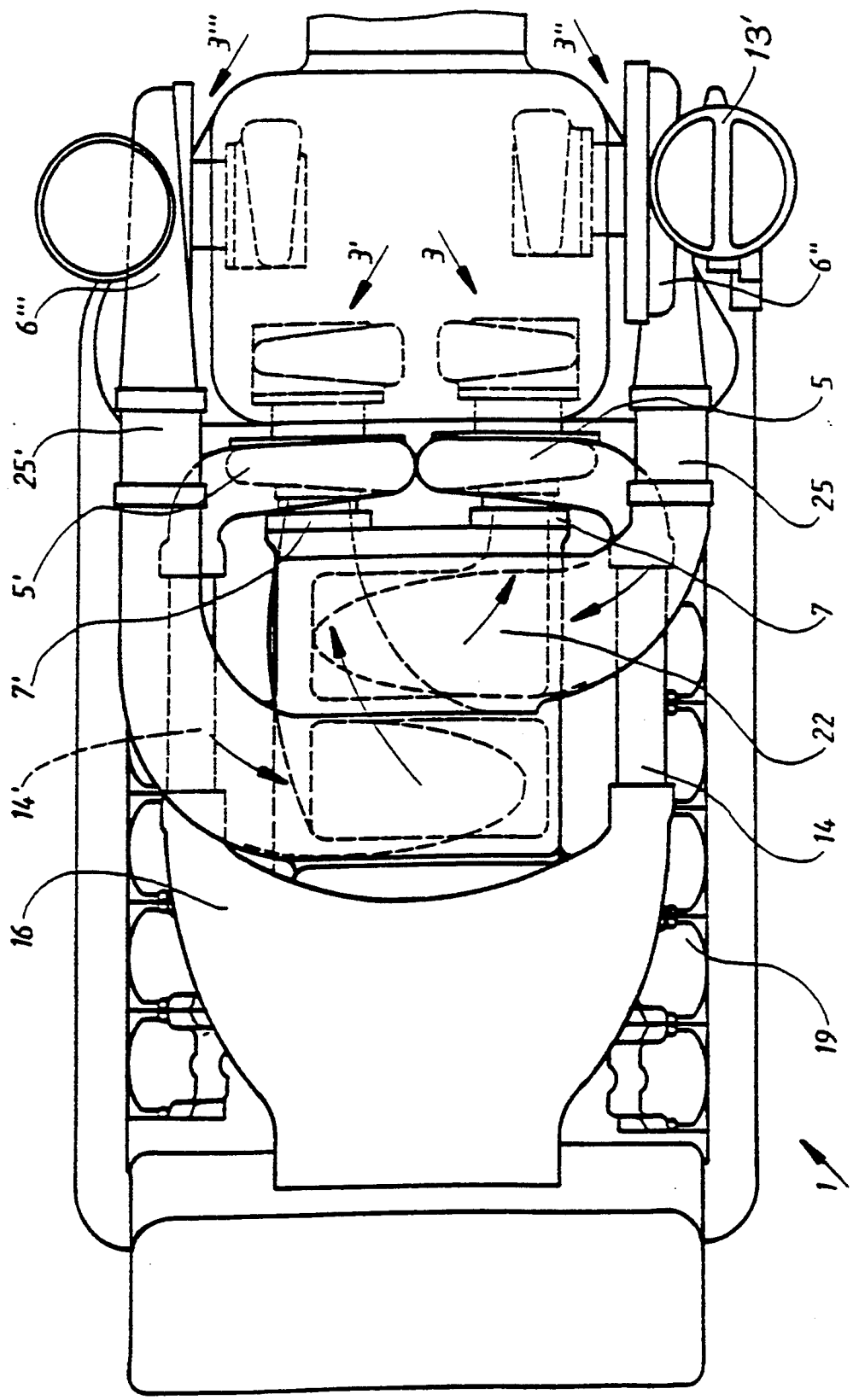
FIG. 4 is a top view of an internal-combustion engine and the intake system for a two-stage supercharging.
Figure 5:
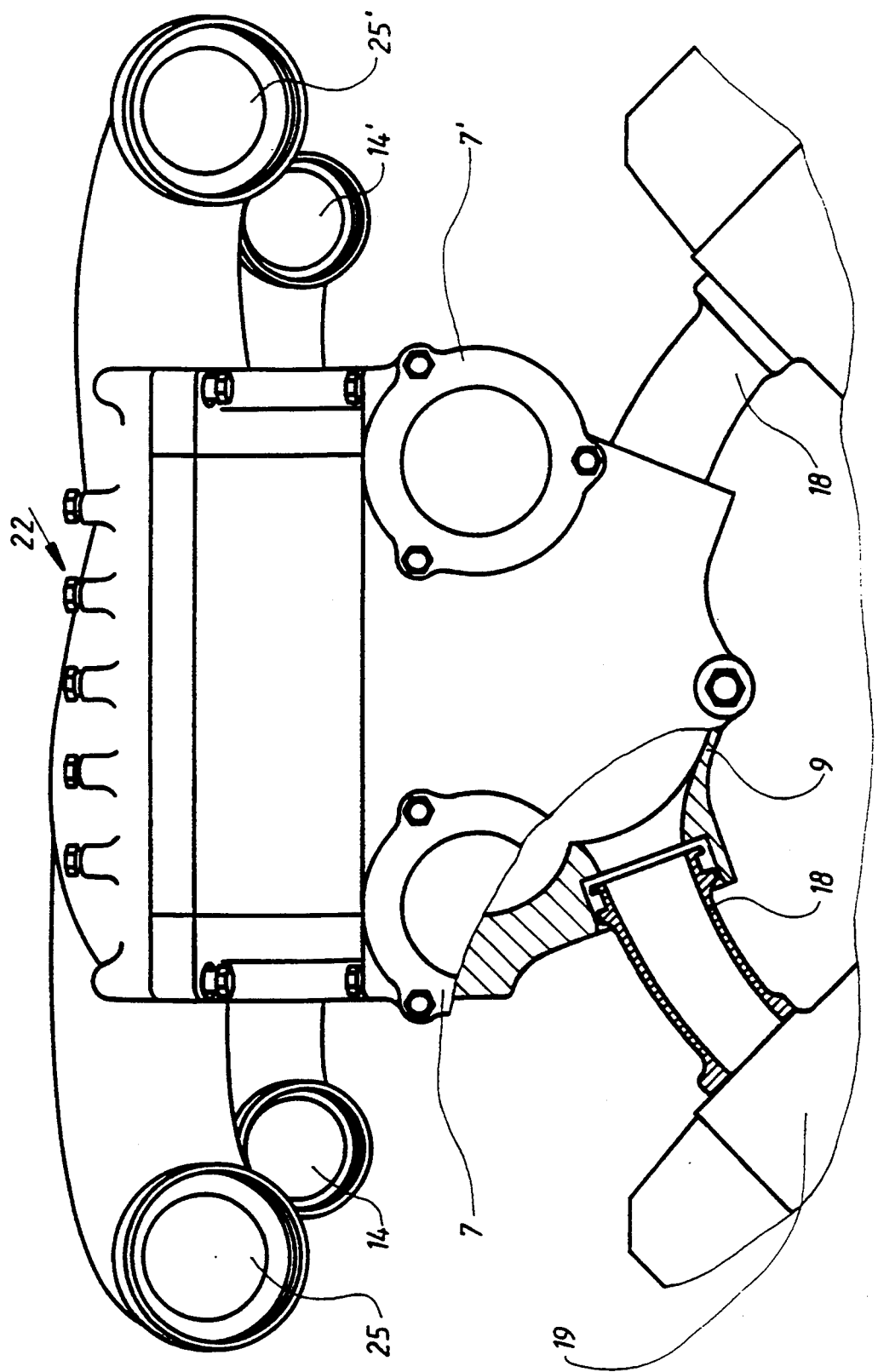
FIG. 5 is a cross-sectional view of an internal-combustion engine along the intersecting line V—V entered in FIG. 3.

FIGS. 3 to 5 show an internal-combustion engine and the construction of the intake system in the case of [a] two-stage supercharging as a longitudinal view and a top view as well as a cross-sectional view. The ambient air is taken in by way of the intake connections of the low-pressure compressors 6″, 6‴ of the low-pressure exhaust gas turbochargers 3″, 3‴ from atmosphere. For the switching-off of one exhaust gas turbocharger group, the inlet of an intake sleeve is provided with a shut-off device 13'. The charge air precompressed by the low-pressure compressors 6″, 6‴, reaches the low-pressure charge air cooler 22, by way of the pipes 25, 25'. The intercooler 22 is fitted onto the tub-shaped bottom part of the flow housing 23 molded onto the air collecting housing 9 instead of the intake funnel 11 used in the case of one-stage supercharging. Here also, the bottom part of the intercooler 22 (not shown), may be constructed as a separate component which can be fitted onto the air collecting housing. The flow housing 23 of the low-pressure charge air cooler 22 has a transverse wall 24 which, in connection with webs 10 in the tub-shaped bottom part, forms separate flow paths. Two separate heat exchanger elements are used as cooler elements. The separate air guidance for the two exhaust gas turbocharger groups 3, 3″ and 3', 3‴ is necessary so that, during the operation of only one exhaust gas turbocharger group, the high-pressure system is separated from the low-pressure system. Otherwise, a short-circuit flow will occur by way of the high-pressure compressor of the stationary charger to the low-pressure compressor. According to the invention, the high-pressure compressor 5, 5' of the high-pressure exhaust gas turbochargers 3, 3' with their intake connections are arranged at the same point as the compressors 4, 4' of the exhaust gas turbochargers 2, 2' in a one-stage supercharging system. Thus the connection tubes 7, 7', which are molded to the air collecting housing 9 and lead to the intake connections of the compressors 4, 4' or high-pressure compressors 5, 5', as well as the pipes 14, 14' leading to the charge air cooler 15 and the connections and fastenings may be designed and arranged in an identical manner in the case of one-stage and two-stage supercharging. In particular, the air collecting housing 9 with the tub-shaped bottom part and the connection tubes 7, 7' molded onto it can be used unchanged in the case of one-stage and two-stage supercharging.

The charge air compressed by the high-pressure compressors 5, 5' which are also arranged in the same manner as in the case of a one-stage supercharging, reaches the charge air cooler 15 by way of the pipes 14, 14'. This cooler 15 now serves as the high-pressure charge air cooler. The housing 16 of the charge air cooler 15 is situated directly next to the housing 23 of the low-pressure charge air cooler 22 on the air collecting housing 9. By means of the intake system according to the invention, an internal-combustion engine can therefore be equipped for a one-stage or two-stage supercharging based on a minimal number of different components. Basically, instead of the intake funnel 11, only a low-pressure charge air cooler 22 must be installed, as well as additional exhaust gas turbochargers with the feeding pipes 25, 25' through which the precompressed charge air reaches the lateral inlet openings of the intercooler 22. The other parts, including the high-pressure groups, may be added in the same arrangement in the case of both engine variants. It is clear that this results in cost advantages because a minimal number of different parts must be manufactured and made available. The arrangement of the intake system between the cylinder banks with the charge air coolers disposed on them and the arrangement of the charge air coolers following a narrow side of the air collecting housing ensure an optimal flow guidance because of short pipe connections with a few by-passes and a good distribution of the flow to the individual cylinders.

Although the present invention has been described and illustrated in detail, it is to be clearly understood that the same is by way of illustration and example only, and is not to be taken by way of limitation. The spirit and scope of the present invention are to be limited only by the terms of the appended claims.

We claim:

1. An intake system for an internal-combustion engine for use with both a one-stage and a two-stage supercharging, comprising:
    an internal combustion engine having cylinder heads with inlet ducts;
    at least one exhaust gas turbocharger located on the internal combustion engine;
    one charge air cooler located on the internal combustion engine;
    one air collecting housing located on the internal combustion engine;
    connection pipe means connecting an outlet of a compressor of the at least one exhaust gas turbocharger to the inlet ducts of the cylinder heads of the internal combustion engine through said one charge air cooler and said one air collecting housing;
    wherein said one air collecting housing and the connection pipe means are substantially identical in shape, size, and location when used with a two-stage supercharging and a one-stage supercharging;
    wherein there is a flow housing for receiving charge air for the internal combustion engine and which flow housing is constructed with an identical sized and shaped bottom part in both one-stage and two-stage supercharging;
    wherein the bottom part has connection tubes for diverting the charge air to the compressor of the at least one exhaust gas turbocharger; and
    wherein the bottom part is located on the internal combustion engine at the same point in one-stage and two-stage supercharging.

2. An intake system according to claim 1, wherein the internal combustion engine is a V-engine and the air collecting housing extends between two cylinder banks arranged in a V-shape along the internal-combustion engine; and
    wherein the charge air cooler and the flow housing with the intake funnel are arranged next to one another on a top side of the air collecting housing.

3. An intake system according to claim 2, wherein the air collector housing has a long side and a narrow side;
    wherein the at least one exhaust gas turbochargers includes two exhaust gas turbochargers, one for each bank of cylinders that are arranged on the narrow side of the air collecting housing;
    wherein the flow housing has an intake funnel; and
    wherein the bottom part of the flow housing with the intake funnel and the charge air cooler with its connection tube are arranged directly opposite the inlets of the compressors of the two exhaust gas turbochargers.

4. An intake system according to claim 1, wherein the bottom part of the flow housing forms an intake housing which is molded to the air collecting housing.

5. An intake system according to claim 2, wherein the bottom part of the flow housing forms an intake housing which is molded to the air collecting housing.

6. An intake system according to claim 3, wherein the bottom part of the flow housing forms an intake housing which is molded to the air collecting housing.

7. An intake system according to claim 1, wherein the top part of the intake housing comprising the intake funnel has a transverse wall which, together with webs in the bottom part of the flow housing forms separate intake ducts for exhaust gas turbochargers assigned to different cylinder bank of the internal combustion engine; and
    wherein one of the intake ducts can be shut off by a shut-off means arranged in the intake funnel.

8. An intake system according to claim 2, wherein the top part of the intake housing comprising the intake funnel has a transverse wall which, together with webs in the bottom part of the flow housing forms separate intake ducts for exhaust gas turbochargers assigned to different cyclinder bank of the internal combustion engine; and
    wherein one of the intake ducts can be shut off by a shut-off means arranged in the intake funnel.

9. An intake system according to claim 3, wherein the top part of the intake housing comprising the intake funnel has a transverse wall which, together with webs in the bottom part of the flow housing forms separate intake ducts for exhaust gas turbochargers assigned to different cyclinder bank of the internal combustion engineer; and
    wherein one of the intake ducts can be shut off by a shut-off means arranged in the intake funnel.

10. An intake system according to claim 1, wherein the air collecting housing is constructed to be open on top in the area of the charge air cooler.

11. An intake system according to claim 2, wherein the air collecting housing is constructed to be open on top in the area of the charge air cooler.

12. An intake system according to claim 3, wherein the air collecting housing is constructed to be open on top in the area of the charge air cooler.

13. An intake system according to claims 1, wherein the air collecting housing is connected with the inlet ducts of the cylinder heads by way of separate intake connections.

14. An intake system according to claims 2, wherein the air collecting housing is connected with the inlet ducts of the cylinder heads by way of separate intake connections.

15. An intake system according to claims 3, wherein the air collecting housing is connected with the inlet ducts of the cylinder heads by way of separate intake connections.

16. An intake system according to claim 1, wherein the at least one exhaust gas turbocharger is a high pressure exhaust gas turbocharger;
    a second high-pressure exhaust gas turbocharger;
    wherein two low-pressure exhaust gas turbochargers are also provided to create two stage supercharging each with a respective high-pressure exhaust gas turbocharger;

wherein the air cooler is a high-pressure charge air cooler and a low-pressure charge air cooler is also provided to cool air entering into both of the low-pressure compressors of the low-pressure exhaust gas turbocharger.

17. An intake system according claim 16, wherein the top part of a low-pressure charge air cooler also has a transverse wall for creating two spaces for the accommodation of separate cooling elements with two-stage supercharging; and wherein the transverse wall together with webs in the bottom part of the flow housing forms separate flow ducts for exhaust gas turbocharger groups assigned to different cylinder banks of the internal combustion engine.

18. An intake system according to claim 16, wherein charge air is guided to the high-pressure charge air cooler and the low-pressure charge air cooler by way of lateral inlets disposed on top of the flow housing in two-stage supercharging.

19. An intake system according to claim 16, wherein the low-pressure exhaust gas turbochargers are located next to the high-pressure exhaust gas turbochargers.

20. An intake system according claim 19, wherein a top part of the low-pressure charge air cooler also has a transverse wall for creating two spaces for the accommodation of separate cooling elements with two-stage supercharging; and wherein the transverse wall together with webs in the bottom part of the flow housing forms separate flow ducts for exhaust gas turbocharger groups assigned to different cylinder banks of the internal combustion engine.

21. An intake system according to claim 19, wherein charge air is guided to the high-pressure charge air cooler and the low-pressure charge air cooler by way of lateral inlets disposed on top of the flow housing in two-stage supercharging.

22. An intake system according to claim 19, wherein the air collector housing has a long side and a narrow side; and wherein the low-pressure exhaust gas turbochargers and the high-pressure exhaust gas turbochargers are located on the narrow side of the air collector housing.

23. An intake system according claim 22, wherein a top part of the low-pressure charge air cooler also has a transverse wall for creating two spaces for the accommodation of separate cooling elements with two-stage supercharging; and wherein the transverse wall together with webs in the bottom part of the flow housing forms separate flow ducts for exhaust gas turbocharger groups assigned to different cylinder banks of the internal combustion engine.

24. An intake system according to claim 22, wherein charge air is guided to the high-pressure charge air cooler and the low-pressure charge air cooler by way of lateral inlets disposed on top of the flow housing in two-stage supercharging.

* * * * *